UNITED STATES PATENT OFFICE.

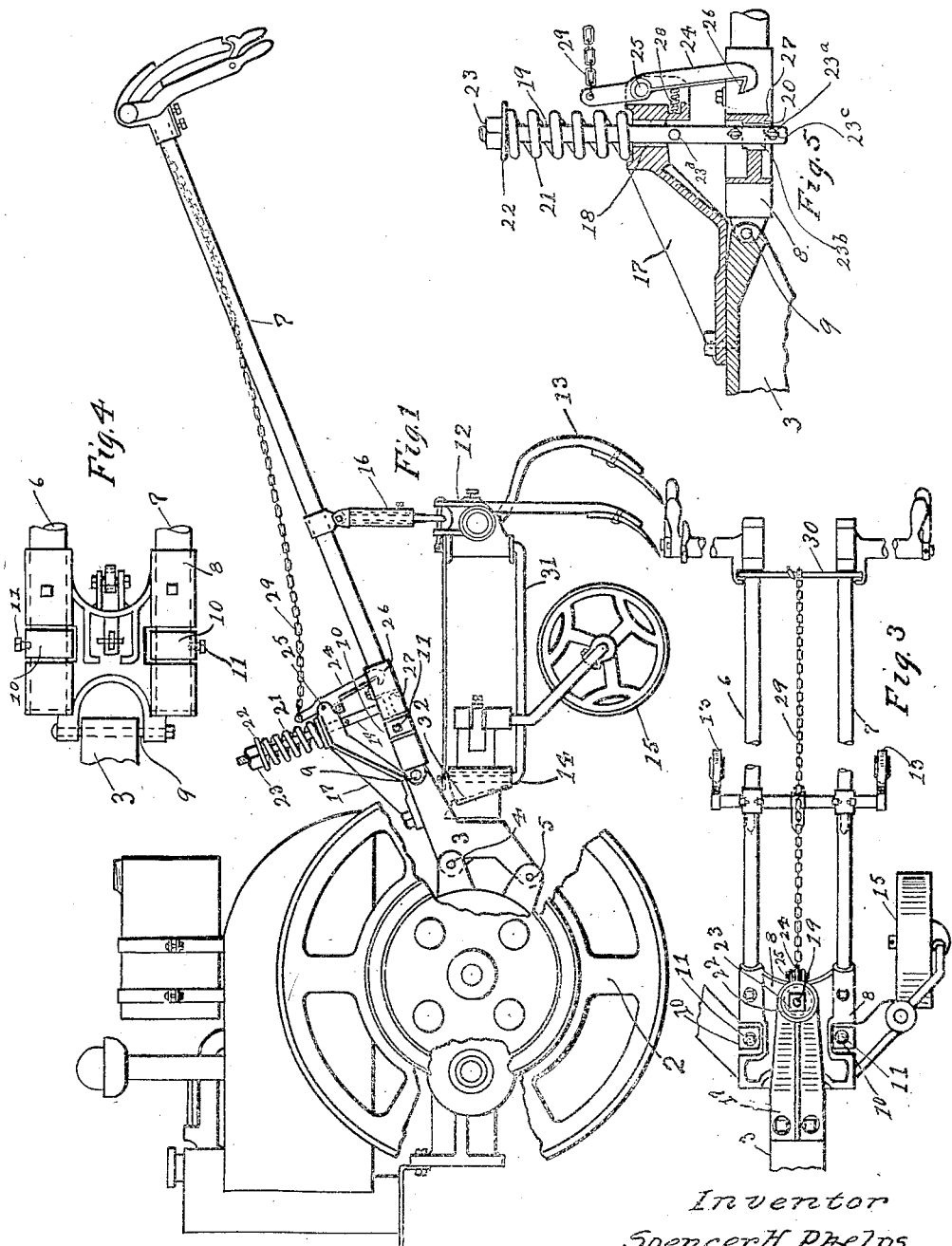

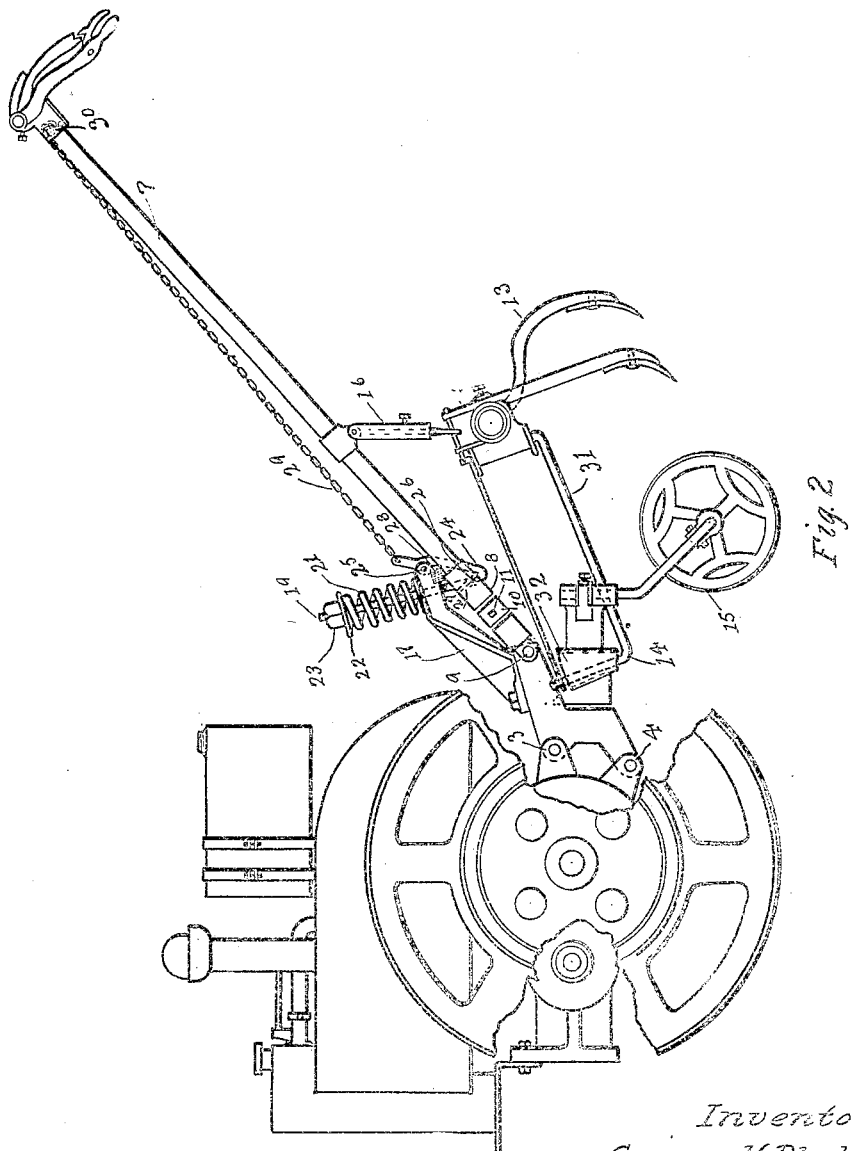

SPENCER H. PHELPS, OF MINNEAPOLIS, MINNESOTA, ASSIGNOR TO BEEMAN GARDEN TRACTOR CO., OF MINNEAPOLIS, MINNESOTA, A CORPORATION OF MINNESOTA.

SUPPORT FOR AGRICULTURAL-IMPLEMENT STEERING-POSTS.

1,331,448.  Specification of Letters Patent.  Patented Feb. 17, 1920.

Application filed May 26, 1919. Serial No. 299,919.

*To all whom it may concern:*

Be it known that I, SPENCER H. PHELPS, a citizen of the United States, resident of Minneapolis, county of Hennepin, State of Minnesota, have invented certain new and useful Improvements in Supports for Agricultural-Implement Steering-Posts, of which the following is a specification.

The object of my invention is to provide convenient means in connection with the steering posts of a garden tractor for supporting the posts and the ground-working implement connected therewith in a raised inoperative position, provision being made for convenient release of the posts and implement whenever desired.

A further object is to provide a supporting device of simple, inexpensive construction and one which can be easily and quickly attached to the machine.

The invention consists generally in various constructions and combinations, all as hereinafter described and particularly pointed out in the claims.

In the accompanying drawings forming part of this specification,

Figure 1 is a side view, partially in section, of a garden tractor with my invention applied thereto, showing the ground-working implement in its depressed or working position, Fig. 2 is a similar view showing the implement raised, with the tools out of contact with the ground, Fig. 3 is a partial plan view, showing the relative arrangement of the steering posts and the locking lever line, Fig. 4 is a detail view, showing the manner of mounting the steering posts on the machine, Fig. 5 is a detail sectional view of the means for locking the steering posts in their raised position.

In the drawing, 2 represents a garden tractor, the details of which I do not illustrate or describe as they form no part of my present invention. 3 is a yoke mounted at 4 and 5 on the frame of the machine and 6 and 7 are steering posts mounted for rotation on a longitudinal axis in a casting 8 which is connected with the yoke 3 by means of a horizontal pivot 9. This pivot allows the steering posts 6 and 7 to be raised and lowered, as desired, and in addition to this movement each post has a rotary movement in the casting 8 and is limited in such movement by a collar 10 and set screw 11 mounted therein. 12 represents a ground-working implement provided in this particular case with a series of cultivators 13 though other tools may be used in place thereof. The frame of this implement is free to oscillate in a support 14 that is connected with the frame of the machine. Caster wheels 15 are also connected with the machine frame. Shifting straps 16 are connected with the posts 6 and 7 and with the ground-working implement frame 12 for lifting said frame or shifting it from side to side. These straps form the subject-matter of a companion application executed of even date herewith and I make no claim to the same in this case.

Mounted on the yoke 3 is a bracket 17 provided with an opening 18 to receive a rod 19, the lower end of which is loosely connected at 20 with the casting 8. The rod 19 projects a considerable distance above the bracket 17 and a coiled spring 21 is mounted thereon between said bracket and a washer 22 that is held in place by a nut 23. This spring forms a yielding support for the casting 8 and the steering posts mounted therein. A lever 24 is pivoted at 25 on the bracket 17 and has a hooked lower end 26 to engage a cross bar 27 provided in said casting and a compression spring 28 normally holds the lever 24 out of engagement with the bar 27. A cable 29 is attached to the upper end of the lever 24 and extends back between the steering posts to a point where it can be conveniently reached by the operator of the machine.

The lower end of the spring 21 bears on the block 17 and the bolt 23 is provided with holes $23^a$ above and below the socket $23^b$ provided for the lower end of the bolt in the casting 8 and in these holes cotter pins $23^c$ are inserted to hold the bolt in place in the casting and cause movement of the bolt vertically with the oscillation of the casting and the steering posts. I prefer also to provide a hole $23^d$ in said bolt into which a cotter pin (not shown) may be inserted to prevent the steering posts from being raised sufficiently to engage the locking lever. The cotter pin will be inserted in the hole $23^d$ only when the operator desires to render the locking lever ineffective as a means for supporting the steering posts.

The cross bar 30 is mounted on the steering posts, preferably near the handles therefor and the loose end of the cable 29 is preferably supported on this cross bar in position to be conveniently reached by the operator of the machine for putting the cable under tension and moving the lever 24 to its locking position against the tension of the compression spring 28 (see Fig. 5). This movement of the lever 24 is performed when the posts are raised to a point where the said lever can engage the lower edge of the cross bar 27 and the hooked end 26 of the lever is so formed that when it engages the cross bar it will remain in interlocking engagement therewith against the tension of the spring 28 until the posts are lifted to release the pull thereof on the lever or disengage the hooked end of the lever from the cross bar. At this time the tension of the spring 28 will be exerted to swing the lower end of the lever 24 backwardly and disengage it from the cross bar. The cable 29 may be slack when the ground-working implement is raised, but is put under tension by the pull of the operator whenever it is desired to move the locking lever to its supporting position. During the upward movement of the steering posts the implement frame will be lifted through the connection 16, the draft rods 31 of the implement oscillating at their forward ends in the guides 32 provided therefor.

This attachment is used in moving the machine from place to place in the field or on the highway or any other point where it is desired to operate the tractor without having the ground-working implement in engagement with or upon the ground.

I claim as my invention:

1. The combination, with a machine frame, of steering posts mounted for vertical oscillation with respect to said frame, a ground-working implement connected with said frame, means connecting said posts with said ground-working implement, and means locking said steering posts and said ground-working implement in their raised position.

2. The combination, with a machine frame, of steering posts mounted for vertical oscillation with respect to said frame, a ground-working implement connected with said frame, means connecting said posts with said ground-working implement, means locking said steering posts and said ground-working implement in their raised position, and means extending to the hand grips of said steering posts for moving said locking means to its locking position.

3. The combination, with a frame, of steering posts mounted for vertical oscillation thereon, a ground-working implement connected with said posts to be lifted thereby, means mounted on said frame and connected with said posts for yieldingly supporting them against downward movement and means for locking said posts and implement in a raised position.

4. The combination, with a frame, of steering posts mounted for vertical oscillation thereon, a ground-working implement connected with said posts to be lifted thereby, means mounted on said frame and connected with said posts for yieldingly resisting downward movement thereof, and a lever mounted to support said posts in their elevated position and means for normally holding said lever in its non-supporting position.

5. The combination, with a frame, of steering posts mounted for vertical oscillation thereon, a ground-working implement connected with said frame, means connecting said implement with said posts, a bracket mounted on said frame, a rod yieldingly mounted on said bracket and connected with said posts for yieldingly resisting downward movement of said posts, a lever mounted on said bracket and having a hooked end for supporting said posts in an elevated position, and means connected with said lever for moving it to its supporting position.

6. The combination, with a frame, of steering posts mounted for vertical oscillation thereon, a ground-working implement connected with said frame, means connecting said implement with said posts, a bracket mounted on said frame, a lever pivoted on said bracket and having a hooked end for supporting said posts in their raised position, a spring for normally holding said lever in its non-supporting position, flexible means connected with said lever for moving it to its supporting position, the hooked end of said lever holding it in such supporting position.

7. The combination, with a frame, of a casting mounted thereon for vertical oscillation, steering posts mounted in said casting, a bracket and supporting lever pivoted thereon and having a hooked lower end, said casting having a cross bar for engagement with the hooked end of said lever, a spring for normally holding said lever out of the path of vertical movement of said cross bar, said lever being held by its hooked end in engagement with said bar when said casting is raised to a predetermined point, and means for moving said lever against the tension of its spring into position to engage said bar and a ground-working implement connected with said frame and with said posts.

8. The combination, with a machine frame, of a steering device mounted for vertical oscillation with respect to said frame, a ground-working implement connected with said frame, means connecting said steering device with said ground-working implement, and means locking said steering device and said ground-working implement in their raised position.

9. The combination, with a frame, of a steering device mounted for vertical oscillation thereof, a ground-working implement connected with said device to be lifted thereby, means mounted on said frame and connected with said steering device for yieldingly supporting it against downward movement, and means for locking said steering device and implement in a raised position.

10. The combination, with a frame, of a steering device mounted for vertical oscillation thereon, a ground-working implement connected with said frame and with said steering device, a lever mounted to engage and support said steering device and implement in their raised position, means for moving said lever to its engaging position when said steering device is raised, means for normally holding said lever in its non-engaging position and returning it to such position when said steering device is raised slightly above its normal raised position.

In witness whereof, I have hereunto set my hand this 16th day of May, 1919.

SPENCER H. PHELPS